United States Patent [19]

Glass et al.

[11] Patent Number: 5,024,051

[45] Date of Patent: Jun. 18, 1991

[54] BOLTED DOUBLE SICKLE CUTTERBAR

[75] Inventors: Emmett F. Glass, Akron; Ernest A. Schoeneberger; Stanley J. Makofka, both of New Holland, all of Pa.

[73] Assignee: Ford New Holland, Inc., New Holland, Pa.

[21] Appl. No.: 547,710

[22] Filed: Jul. 2, 1990

[51] Int. Cl.⁵ ............................................. A01D 34/14
[52] U.S. Cl. ........................................ 56/297; 56/300; 411/366
[58] Field of Search ................. 56/259, 296, 297, 299, 56/300; 411/366, 368, 371, 337, 531

[56] References Cited

U.S. PATENT DOCUMENTS

| | | | |
|---|---|---|---|
| 1,134,588 | 4/1915 | Conner | 56/300 |
| 1,364,414 | 1/1921 | Smith | 56/300 |
| 3,151,434 | 10/1964 | Hamel | 56/296 |
| 3,577,716 | 5/1971 | McCarty et al. | 56/259 |
| 3,828,422 | 8/1974 | Schmitt | 411/366 X |
| 4,198,803 | 4/1980 | Quick et al. | 56/296 |

FOREIGN PATENT DOCUMENTS 238508 9/1910 Fed. Rep. of Germany ........ 56/299

Primary Examiner—Ramon S. Britts
Assistant Examiner—David J. Bagnell
Attorney, Agent, or Firm—Larry W. Miller; Frank A. Seemar; Darrell F. Marquette

[57] ABSTRACT

A reciprocating cutterbar of the type utilizing a pair of counter-reciprocating sickles driven at the opposing outboard ends and overlapping at the inboard ends thereof is disclosed wherein the knife sections are detachably affixed to the respective support bars of these sickles by special threaded fasteners to permit the overlapped knife sections to maintain a close shearing relationship. These special threaded fasteners include a head portion adapted to be countersunk into the body of the knife section below the surface thereof, a threaded portion adapted to be threadably engaged with a nut to effect a clamping load between the knife section and support bar, and an intermediate portion having a non-circular cross-sectional configuration engageable with a corresponding non-circular opening formed in the support bar to restrict rotation thereof when the fastener is engaged therewith. The head portion of the fastener includes a chamfered surface engageable with a ccorresponding chamfered surface surrounding the hole through the knife section to permit the fastener to firmly engage the knife section while being countersunk therein.

15 Claims, 2 Drawing Sheets

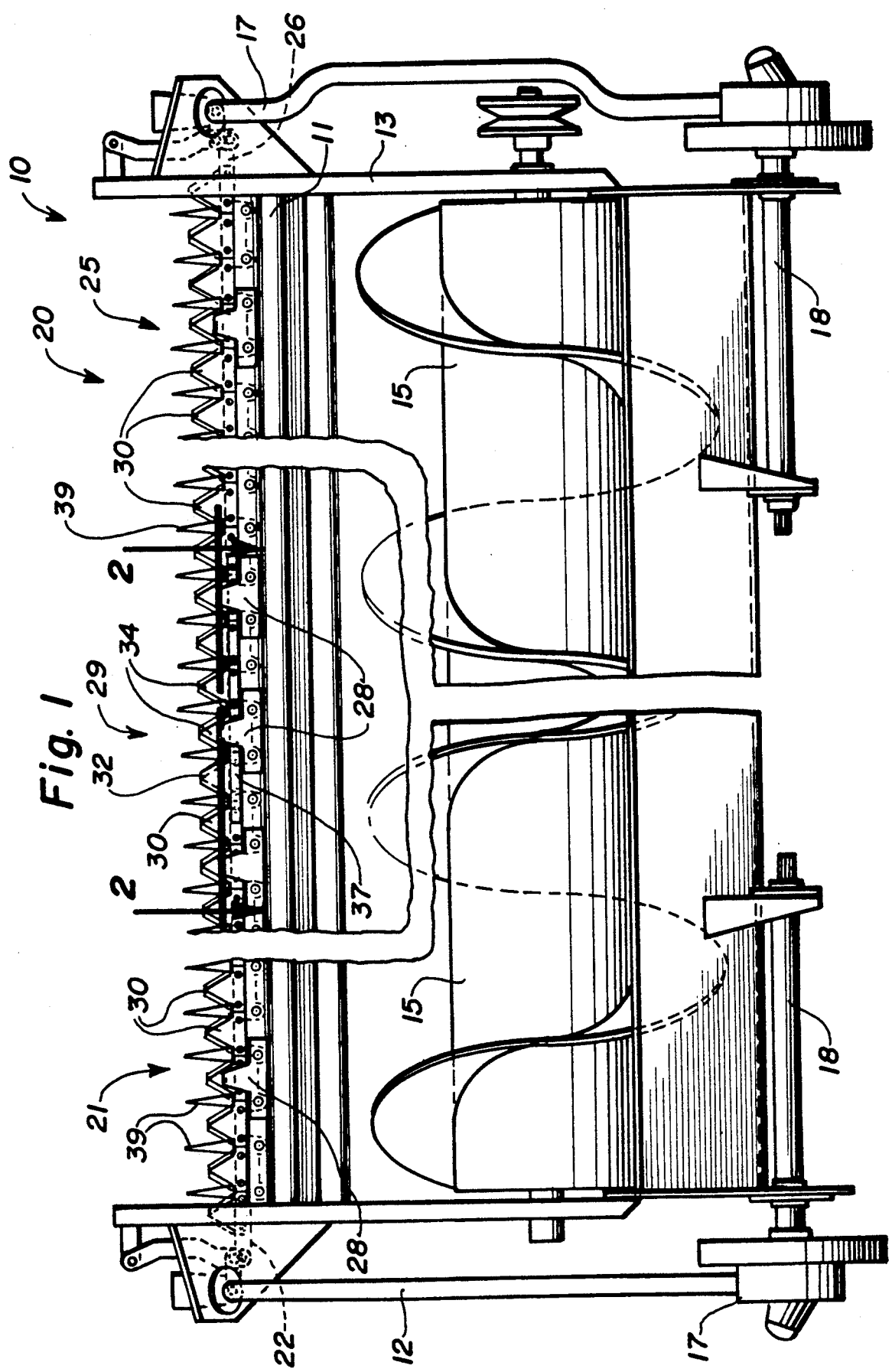

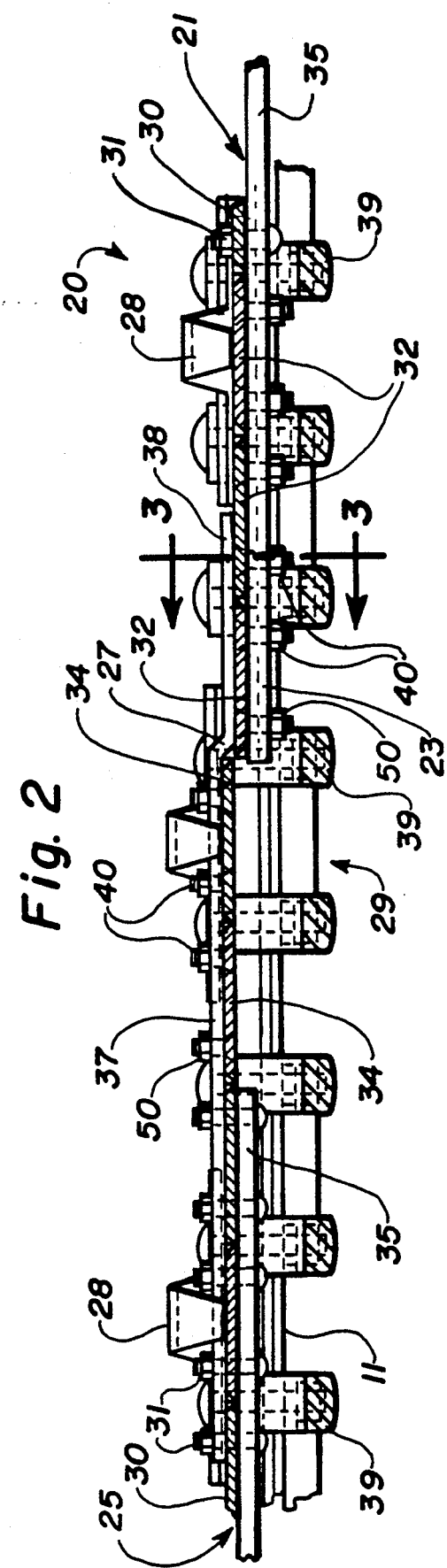
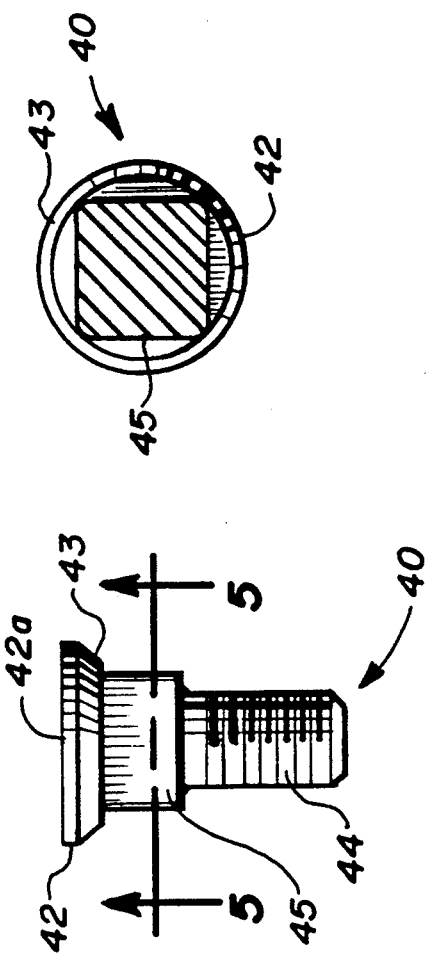
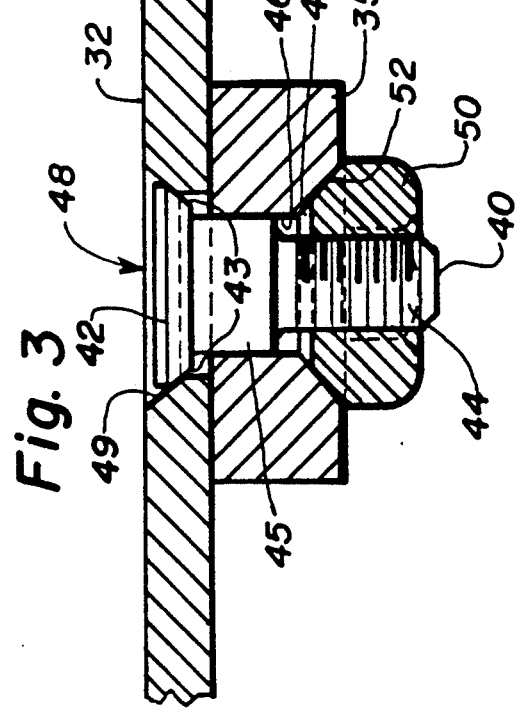

BOLTED DOUBLE SICKLE CUTTERBAR

BACKGROUND OF THE INVENTION

Double sickle or split sickle mowing devices such as shown in U.S. Pat. No. 3,577,716, issued to Horace G. McCarty, et al on May 4, 1971, have proved to be particularly advantageous on harvesting machines having a relatively wide cutting width, at least in part due to the counter reciprocating masses of the opposing sickles. A relatively recent innovation in the marketing of reciprocating cutterbars has been the utilization of easily removable threaded fasteners to connect the individual sickle sections to the support bar running transversely along the cutterbar, as shown in U.S. Pat. No. 4,198,803. Prior to the utilization of these threaded fasteners, knife sections were typically riveted to the support bar.

As can be seen in the aforementioned U.S. Pat. No. 3,577,716, this split sickle-type of cutterbar provides for an overlap of the individual sickles at the transverse center of the harvesting machine. In this overlap area, the overlapping knife sections move in close proximity to each other and can actually sever crop by shearing against each other, as well as against the knife guards, during their operative movement. This close proximate relationship requires that the fastener, e.g. rivet, not have a head protruding outwardly beyond the surface of the knife sections facing the opposing knife section against which the shearing relationship exists.

A combination of the teachings of the split sickle device taught in the aforementioned U.S. Pat. No. 3,577,716 and the teachings of the aforementioned U.S. Pat. No. 4,198,803, in which the rivets had been replaced by threaded fasteners, has resulted in double sickle cutterbars having threaded fasteners attaching the knife sections to the respective support bars along the entire width of the cutterbar except in the overlap area where conventional riveting has been utilized because an effective threaded fastener system has not been developed. Accordingly, it would be advantageous to provide a threaded fastener that could be used in conjunction with double sickle cutterbars in the overlap area to gain the advantages associated with the easy removal of knife sections attached to the corresponding support bar by threaded fasteners along the entire length of the cutterbar, thereby providing an improved double sickle cutterbar.

SUMMARY OF THE INVENTION

It is an object of the invention to overcome the aforementioned disadvantages of the prior art by providing a double sickle cutterbar utilizing threaded fasteners along the entire length of the cutterbar, including the overlap area.

It is another object of this invention to provide a special threaded fastener that can be utilized in the overlap area of a double sickle cutterbar.

It is a feature of this invention that the head of the fastener utilized in the overlap area of a split sickle cutterbar can be recessed within the body of the knife section.

It is an advantage of this invention that the head portion of the threaded fastener utilized in the overlap area of a split sickle cutterbar does not disrupt the shearing relationship between opposing knife sections in the overlap area.

It is another feature of this invention that the threaded fastener is provided with a non-circular intermediate portion engageable with an opening of corresponding shape in the support bar to restrict the rotational movement of the threaded fastener during installation and removal.

It is another advantage of this invention that the threaded fastener utilized in the overlap area of a split sickle cutterbar can be manipulated to provide a clamping load on the knife section engaged thereby through the utilization of a single tool.

It is still another feature of this invention that the head portion of the threaded fastener is provided with a chamfered surface engageable with a corresponding chamfered surface surrounding the hole in the knife section through which the fastener is inserted.

It is still another advantage of this invention that the chamfered surface on the head portion of threaded fastener can be utilized to secure a clamping load on the knife section while permitting the head portion to the countersunk into the body of the knife section.

It is yet another feature of this invention that the nut engageable with the threaded portion of the threaded fastener is provided with a chamfered surface engageable with a circular chamfered surface surrounding the non-circular opening through the support bar.

It is yet another advantage of this invention that the interengagement of the chamfered surfaces of the nut and support bar structure provides adequate clearance between the sickles and the guards in the overlap area and resists a tendency for the hardware to loosen.

It is a further feature of this invention that the size of the hole through the knife section permits the non-circular intermediate portion of the fastener to pass therethrough for engagement with the opening through the support bar aligned therewith.

It is yet another advantage of this invention that the knife sections in the overlap area of the double sickle cutterbar can be quickly and easily installed and removed with a single tool.

It is still another object of this invention to provide an entirely bolted double sickle cutterbar which is durable in construction, inexpensive of manufacture, carefree of maintenance, facile in assemblage, and simple and effective in use.

These and other objects, features and advantages are accomplished according to the instant invention by providing a reciprocating cutterbar of the type utilizing a pair of counter-reciprocating sickles driven at the opposing outboard ends and overlapping at the inboard ends thereof wherein the knife sections are detachably affixed to the respective support bars of these sickles by special threaded fasteners to permit the overlapped knife sections to maintain a close shearing relationship. These special threaded fasteners include a head portion adapted to be countersunk into the body of the knife section below the surface thereof, a threaded portion adapted to be threadably engaged with a nut to effect a clamping load between the knife section and support bar, and an intermediate portion having a non-circular cross-sectional configuration engageable with a corresponding non-circular opening formed in the support bar to restrict rotation thereof when the fastener is engaged therewith. The head portion of the fastener includes a chamfered surface engageable with a corresponding chamfered surface surrounding the hole through the knife section to permit the fastener to firmly engage the knife section while being countersunk therein.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a top plan view of a crop harvesting header incorporating the principles of the instant invention;

FIG. 2 is a partial cross-sectional view of the overlap area at the transverse center of harvesting header corresponding to lines 2—2 of FIG. 1, to provide an elevational view of the overlap area of the cutterbar;

FIG. 3 is an enlarged partial cross-sectional view of the overlap area showing one of the threaded fasteners utilized to attach the inner knife sections to the support bars, as seen along lines of 3—3 of FIG. 2, providing an elevational view of the threaded fastener in position for clamping the inner knife section to the support bar;

FIG. 4 is a detailed elevational view of the threaded fastener seen in FIG. 3; and FIG. 5 is a cross-sectional view taking along lines of 5—5 of FIG. 4 to show the cross-sectional configuration of the non-circular intermediate portion of the threaded fastener.

DETAILED DESCRIPTION OF THE PREFERRED EMBODIMENT

Referring now to the drawings and, particularly, to FIG. 1, a top plan view of a crop harvesting header, commonly attached to the frame of a crop harvesting machine such as a windrower or a mower-conditioner, incorporating the principles of the instant invention, can be seen. Any left and right references are used as a matter of convenience and are determined by standing behind the crop harvesting header and facing the forward end, the direction of travel, looking across the header with the cutterbar positioned at the forward edge thereof for initial engagement of standing crop material.

The crop harvesting header 10 is used to sever crop material from the field and effect a rearward conveyance of the severed crop material into further harvesting apparatus (not shown) carried by the machine to which the header 10 is mounted. Accordingly, the header 10 would incorporate a cutterbar 20 disposed along the forward edge thereof to engage standing crop material to effect a severing thereof from the ground. The severed crop material would then be engaged by a conventional auger 15 to consolidate the severed crop material and feed it rearwardly to additional conventional harvesting apparatus (not shown), such as a conventional conditioning mechanism. Such crop harvesting headers 10 typically are provided with a reel (not shown) to assist in the conveying of severed crop material from the cutterbar 20 to the auger 15. As can be seen in FIG. 1, the conventional reel has been deleted from the drawing to permit a better viewing of the cutterbar 20.

Referring now to FIGS. 1 and 2, the cutterbar 20 is provided with a left sickle 21 disposed from the left side sheet 12 toward the transverse center of the header 10 and a right sickle 25 disposed in registered alignment with the left sickle 21 and extending from the right side sheet 13 toward the transverse center of the header 10. Each sickle 21, 25 is driven by a drive mechanism 17 supported adjacent the corresponding side sheet 12, 13 and drivingly connected to the respective outboard ends 22, 26 of the left and right sickles 21, 25, respectively. The drive mechanism 17 is conventional in structure and is driven by respective drive shafts 18 operatively connected to a conventional source of rotational power (not shown). Each drive mechanism 17 converts the rotational power delivered by the drive shafts 18 into reciprocating motion for transversely moving each respective sickle 21, 25 in an opposing fashion as is known in the art.

One skilled in the art will readily see that the left and right sickles 21, 25, respectively, are composed of a plurality of knife sections 30 attached to an elongated, transversely extending support bar 35. Each knife section 30 has a conventional diagonally extending cutting edge forming a somewhat triangular shape to the knife section 30, and is positioned in registration with a plurality of knife guards 39 to create a shearing action therebetween to affect a severing of standing crop material from the ground. As is conventional, the guards 39 are detachably fixed to the frame 11 of the header 10 and project forwardly therefrom to support the sickles 21, 25 for transverse, reciprocal sliding movement relative thereto as induced by the drive mechanism 17. Conventional holddowns 28 engage the upper surface of the sickles 21, 25 to keep the knife sections 30 in proper shearing relationship with the guards 39.

The overlap area 29 can be defined as being located proximate to the transverse center of the header 10 and is provided by reason of the opposing reciprocal movement of the respective sickles 21, 25 and the need to maintain a constant shearing action along the entire transverse length of the cutterbar 20 during operation of the cutterbar. The inboard end 23 of the left sickle 21 has attached thereto three inner knife sections 32 fastened to the support bar 35 in such a manner that no portion of the fastener 40 projects above the upper surface of the inner knife sections 32. Similarly, the right sickle 25 has two inner knife sections 34 affixed to a support bar extension 37 at the inboard end 27 by fasteners 40 that have no portion thereof extending below the surface of the inner knife sections 34 facing the lower inner knife sections 32.

All other knife sections 30 on both the left and right sickles 21, 25 are affixed to the support bars 35 by threaded fasteners 31 equipped with hexagonal nuts in a conventional manner. The knife sections 32 are mounted on top of the support bar 35 and affixed thereto with a special threaded fastener 40 extending therethrough. The inner knife sections 34 are similarly attached below the support bar extension 37 by the special threaded fastener 40 described in greater detail below. The inner knife sections 32, 34 are operable within the overlap area 29.

The support bar extension 37 extends beyond the inboard end 27 of the right sickle 25 and contains a bent portion 38 that slides over the upper surface of the inner knife sections 32 to maintain a vertically spaced relationship between the left and right sickles 21, 25 during operation thereof. It can be seen that the inner knife sections 32 are maintained in a shearing relationship with the inner knife sections 34 during operation of the cutterbar 20 to effect a severing of crop material along the transverse center of the header 10. The endmost inner knife section 32 can be inverted as is known in the art to provide a more precise shearing relationship at the inboard ends 23, 27 of the respective sickles 21, 25.

Referring now to FIGS. 2-5, it can be seen that the special threaded fastener 40 includes a head portion 42 adapted to the countersunk into the body of the inner knife sections 32, 34, and defining one end of the fastener 40, while the opposing end of the fastener 40 is formed as a threaded portion 44 which is adapted to threadably receive a special hexagonal nut 50. The fastener 40 also includes an intermediate portion 45 positioned between the head portion 42 and the threaded portion 44. The intermediate portion 45 has a non-circular cross-sectional configuration, while both the head portion 42 and the threaded portion 44 are circular in cross-section.

The intermediate portion 45 is engageable with an opening 46 formed in the support bar 35 in a shape corresponding to the non-circular cross-sectional configuration of the intermediate portion 45. As seen in FIG. 5, the intermediate portion 45 is preferably square, although the shape could be any non-circular configuration so that insertion of the intermediate portion 45 into the opening 46 prevents the fastener 40 from rotating relative to the support bar 35. With respect to the inner knife section 34, the support bar extension 37 is constructed similarly to the inner end 23 of the left sickle 21 with a corresponding non-circular opening 46 extending therethrough for engagement with the intermediate portion 45 of the corresponding fastener 40.

The head portion 42 is provided with a chamfered surface 43 extending around the circumference thereof and being engageable with a corresponding chamfered surface 49 surrounding the hole 48 formed through the inner knife sections 32, 34. The purpose of the chamfered surface 49 extending around the head portion 42 is to allow a proper seating of head portion 42 against the relatively thin inner knife sections 32, 34, while permitting the head portion 42 to be recessed into the body of the inner knife sections 32, 34, as depicted in FIG. 3. Depending on the thickness of the inner knife section 32, 34, the head portion 42 will have the flat top surface 42a thereof positioned either flush with the surface of the knife section 32, 34 or recessed below as shown in FIG. 3.

To provide a wedged engagement between the fastener 40 and the support bar 35, or support bar extension 37, the opening 46 on the side of the support bar 35 or extension 37 away from the corresponding inner knife section 32, 34 is provided with a circular chamfered surface 47 surrounding the non-circular opening 46 to be engageable with a corresponding chamfered surface 52 on the nut 50. As a result, the tightening of the nut 50 on the threaded portion 44 of the fastener 40 can effect a substantial clamping load on the inner knife sections 32, 34 in the corresponding support bar 35 or support bar extension 37. Furthermore, the interengagement of the nut 50 with the chamfered surface 47 reduces the overall height of the fastener assembly 40, 50 by a partial countersinking of the nut 50 into the support member 35, 37 and also resists a tendency for the nut 50 to loosen which would create problems in the narrow confines of the overlap area 29.

In operation, an inner knife section 32, 34 is detachably connected to the corresponding support bar 35 or support bar extension 37 by passing the fastener 40 through a hole 48 in the inner knife section 32, 34 and an aligned opening 46 in the support bar 35 or support bar extension 37 until the intermediate portion 45 is engaged in the corresponding non-circular opening 46, thereby restricting the rotational movement of the fastener 40. A threading of the nut 50 with the chamfered surface 52 thereof adjacent the support bar 35 or support bar extension 37 will draw the head portion 32 firmly into the corresponding inner knife section 32, 34 with the chamfered surface 43 thereof engaged with the corresponding chamfered surface 49 of the hole 48.

A further tightening of the nut 50 on the threaded portion 44 of the fastener 40 will wedge the chamfered surface 52 of the nut 50 into the circular chamfered depression 47 formed around the non-circular opening 46 to effect a substantial clamping load fixing the respective inner knife section 32, 34 on the support bar 35 or support bar extension 37 and provide the necessary clearance between the guards 39 and the sickles 21, 25, particularly for the left sickle 21. With the head portion 42 countersunk into the corresponding inner knife section 32, 34, no portion of the fastener 40 is exposed above the surface facing the opposing inner knife section 32, 34 to interfere with the registering relationship between the inner knife sections 32 and the inner knife sections 34. Since the intermediate portion 45 prevents the fastener 40 from rotating when engaged with the support bar 35 or extension 37, the fastener can be installed with a single tool manipulating rotation of the nut 50.

Removal of the fastener 40 to affect a detaching of the inner knife sections 32, 34 from the corresponding support bar 35 or extension 37 can be accomplished in the opposite manner to the installation noted above. Since the fastener 40 is restricted from rotation due to the engagement of the non-circular intermediate portion 45 and the corresponding opening 46, the fastener 40 can be removed with the use of a single tool manipulating rotation of the nut 40 on the threaded portion 44 away from the support bar 35 or extension 37. As a result, a split sickle cutterbar is provided with all of the knife sections 30, 32, 34 being detachably fixed to the support bars 35 or extension 37 with threaded fasteners 31, 40.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a harvesting machine having a crop engaging header operable to engage standing crop material and initiate a crop harvesting process, said header having a frame and a forwardly disposed cutterbar operable to sever standing crop material, said header being operable to convey said severed crop material away from said cutterbar for further harvesting treatment, said cutterbar having a pair of transversely reciprocating sickles movably supported by said header frame for cooperative association with a plurality of transversely disposed knife guards to effect a shearing action to sever said standing crop material, each said sickle having an elongated, transversely disposed support bar having a plurality of knife sections detachably affixed thereto for cooperative association with said guards, each said sickle having an inner end terminating proximate to the transverse center of said header, the inner knife sections adjacent said inner ends of each respective said sickle being spaced vertically to permit said sickles to overlap in operative movement, each said inner knife section having a pair of holes therethrough registerable with a corresponding pair of openings through said support bar, each said inner knife section being connected to said support bar by fasteners extending through aligned holes and openings, an improved fastener comprising:

a threaded portion at one end of the fastener engageable with a nut;

an enlarged head portion forming the opposing end of the fastener and being engageable with said inner knife section to be countersunk below the surface of said inner knife section facing the opposing said inner knife section; and a intermediate portion disposed between said head portion and said threaded portion and having a non-circular cross-sectional configuration, said intermediate portion being sized to pass through said hole in said knife portion for engagement with said aligned opening having a configuration corresponding to said non-circular cross-sectional configuration of said intermediate portion so that said fastener cannot rotate within said aligned opening.

2. The harvesting machine of claim 1 wherein each said inner knife section has a chamfered surface surrounding each said hole and being mateable with a corresponding chamfered surface of said head portion, said chamfered surfaces on said head portion and surrounding said hole being formed to permit said head portion to be countersunk below the surface of said inner knife section facing the opposing said inner knife section while maintaining a clamping force against said knife section.

3. The harvesting machine of claim 2 wherein said support bar has a chamfered surface surrounding said opening and being mated with said nut which is provided with a corresponding chamfered surface, the threading said nut onto said threaded portion of said fastener effecting a clamping of said inner knife section to said support bar between said head portion and said nut, the engagement between said intermediate portion and said non-circular opening in said support bar permitting said nut to be tightened on said threaded portion without the use of a second tool to restrain said fastener from rotating.

4. A reciprocating cutterbar for use on a harvesting machine to sever standing crop material from the ground and initiate the crop harvesting process, comprising:

a first sickle adapted to be reciprocally driven from an outboard end and terminating at an inboard end, said first sickle including a first elongated support bar having a plurality of openings therethrough and a plurality of knife sections detachably affixed to said first support bar, including at least one first inner knife section positioned adjacent said inboard end, each said knife section having a pair of holes extending therethrough and alignable with a corresponding pair of openings in said first support bar;

a second sickle vertically spaced relative to and positioned in registered alignment with said first sickle, said second sickle being adapted to be reciprocally driven from an outboard end and terminating at an inboard end adjacent said inboard end of said first sickle, said second sickle including a second elongated support bar having a plurality of openings therethrough and a plurality of knife sections detachably affixed to said second support bar, including at least one second inner knife section positioned adjacent said inboard end with a surface thereof facing a corresponding surface on said first inner knife section, each said knife section having a pair of holes extending therethrough and alignable with a corresponding pair of openings in said second support bar;

each said inner knife section having a chamfered surface surrounding a circular opening extending therethrough, each said inner knife section opening being aligned with a noncircular opening extending through said corresponding support bar; and a fastener extendible through each respective hole in said inner knife sections and the aligned opening through the corresponding said support bar, said fastener having a circular head portion including a chamfered surface engageable with the chamfered surface around the corresponding said hole such that said head portion is countersunk below the surface of said inner knife section, said fastener further having a circular threaded portion extendable through the corresponding said support bar for engagement with a nut to effect a clamping load fastening said inner knife section to the corresponding said support bar, said fastener also including a non-circular intermediate portion located between said head portion and said threaded portion, said intermediate portion having a configuration corresponding to said non-circular openings through said support bars so that said fasteners cannot be rotated when inserted through said support bars.

5. The cutterbar of claim 4 wherein each said support bar has a circular chamfered surface surrounding each said noncircular opening for engagement with a corresponding chamfered surface on each corresponding said nut.

6. The cutterbar of claim 5 wherein said first inner knife section registers with said second inner knife section to create a shearing action therebetween to sever crop material presented to said cutterbar adjacent said inboard ends.

7. The cutterbar of claim 6 wherein each said sickle has at least two inner knife sections having corresponding registrable surfaces permitting the sickles to maintain an overlapping relationship during operation thereof.

8. The cutterbar of claim 7 wherein said second sickle is spaced above said first sickle, said second sickle being provided with a support bar extension extending from said second bar for sliding engagement with said first sickle bar to maintain the vertical spacing therebetween, at least one of said second inner knife sections being detachably affixed to said support bar extension.

9. The cutterbar of claim 8 wherein said intermediate portion is of a size that can pass through the holes in said inner knife sections to reach the aligned opening in said corresponding support bar.

10. A fastener for attaching an overlap sickle section to a support bar of a double sickle reciprocating cutterbar, comprising:

a head portion forming one end of said fastener and being engageable with said overlap knife section having a hole therethrough adapted to permit said head portion to be countersunk into said overlap knife section;

a threaded portion forming the opposing end of said fastener and being adapted for engagement with a nut to effect a clamping of said overlap knife section and said support bar between said head portion and said nut, thereby detachably affixing said overlap knife section to said support bar; and an intermediate portion positioned between said head portion and said threaded portion and having a non-circular cross-sectional configuration, said intermediate portion being smaller than the hole through said overlap knife section so that said intermediate portion can pass through said overlap knife section to be engageable with a corresponding opening through said support bar such that said fastener is restricted from rotating relative to said support bar when engaged therewith.

11. The fastener of claim 10 wherein said head portion and said threaded portion are circular.

12. The fastener of claim 11 wherein said head portion is provided with a chamfered surface engageable with a corresponding chamfered surface in said knife section surrounding said hole.

13. The fastener of claim 12 wherein said head portion has a flat top surface.

14. The fastener of claim 13 wherein said intermediate portion has a square cross-sectional configuration mateable with a square opening formed in said support bar.

15. The fastener of claim 14 wherein said nut has a chamfered surface engageable with a corresponding chamfered surface on said support bar, said chamfered surface being circular in shape.

* * * * *